United States Patent
Oteri et al.

(10) Patent No.: US 12,279,285 B2
(45) Date of Patent: Apr. 15, 2025

(54) SEARCH SPACE SET SWITCHING

(71) Applicant: Apple Inc., Cupertino, CA (US)

(72) Inventors: Oghenekome Oteri, San Diego, CA (US); Huaning Niu, San Jose, CA (US); Chunhai Yao, Beijing (CN); Chunxuan Ye, San Diego, CA (US); Dawei Zhang, Saratoga, CA (US); Hong He, San Jose, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN); Wenshu Zhang, San Diego, CA (US); Wei Zhang, Santa Clara, CA (US); Haitong Sun, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 214 days.

(21) Appl. No.: 17/438,157

(22) PCT Filed: Apr. 6, 2021

(86) PCT No.: PCT/CN2021/085679
§ 371 (c)(1),
(2) Date: Sep. 10, 2021

(87) PCT Pub. No.: WO2022/213269
PCT Pub. Date: Oct. 13, 2022

(65) Prior Publication Data
US 2023/0189305 A1  Jun. 15, 2023

(51) Int. Cl.
*H04W 72/51* (2023.01)
*H04L 5/00* (2006.01)
(Continued)

(52) U.S. Cl.
CPC ......... *H04W 72/51* (2023.01); *H04L 5/0053* (2013.01); *H04W 48/12* (2013.01);
(Continued)

(58) Field of Classification Search
CPC . H04W 72/51; H04W 48/12; H04W 72/0446; H04W 72/232; H04W 72/23; H04L 5/0053
See application file for complete search history.

(56) References Cited

U.S. PATENT DOCUMENTS

| | | | |
|---|---|---|---|
| 2019/0394772 A1* | 12/2019 | Li | H04W 76/27 |
| 2021/0144717 A1* | 5/2021 | Tsai | H04W 8/24 |
| 2022/0225135 A1* | 7/2022 | Cirik | H04L 5/0091 |

FOREIGN PATENT DOCUMENTS

| | | |
|---|---|---|
| CN | 111200871 | 5/2020 |
| CN | 111385892 | 7/2020 |

(Continued)

OTHER PUBLICATIONS

English translation of WO 2022082799 A1, 2022. [retrieved on Apr. 3, 2024]. Retrieved from PE2E Search Database. (Year: 2022).*
(Continued)

*Primary Examiner* — Omar J Ghowrwal
(74) *Attorney, Agent, or Firm* — Kowert, Hood, Munyon, Rankin & Goetzel, P.C.

(57) ABSTRACT

This disclosure relates to techniques for improving capability signaling and performing search space set switching, particularly with large sub-carrier spacings, as in high frequency ranges. In various scenarios, a user equipment (UE) device may signal its capability to perform multi-slot PDCCH monitoring and/or single-slot PDCCH monitoring, e.g., at various sub-carrier spacings, for various PDCCH/DCI types, etc. Various technical difficulties in this area are addressed, including increasing flexibility and versatility in
(Continued)

capability signaling, overbooking, signaling and timing of search space set switching, and beam sweeping transmission of DCI Format 2_0, among others.

20 Claims, 14 Drawing Sheets

(51) Int. Cl.
*H04W 48/12* (2009.01)
*H04W 72/0446* (2023.01)
*H04W 72/23* (2023.01)
*H04W 72/232* (2023.01)

(52) U.S. Cl.
CPC ....... *H04W 72/0446* (2013.01); *H04W 72/23* (2023.01); *H04W 72/232* (2023.01)

(56) References Cited

FOREIGN PATENT DOCUMENTS

| CN | 112237033 A | 1/2021 | | |
|---|---|---|---|---|
| GB | 2597807 | 2/2022 | | |
| WO | 2020005914 A1 | 1/2020 | | |
| WO | WO-2022082799 A1 | * | 4/2022 | ............. H04L 5/001 |

OTHER PUBLICATIONS

Extended European Search Report for EP Patent Application No. 21873700.5, 13 pages; Aug. 1, 2022.
Vivo "Discussion on DCI-based power saving adaptation in connected mode"; 3GPP TSG RAN WG1 #104-e R1-2100455; 7 pages; Jan. 25-Feb. 5, 2021.
Nokia et al. "PDCCH monitoring enhancements"; 3GPP TSG RAN WG1 #104e R1-2100258; 5 pages; Jan. 25-Feb. 5, 2021.
"3rd Generation Partnership Project; Technical Specification Group Radio Access Network; NR; Physical layer procedures for control"; 3GPP TS 38.213 v16.5.0; 183; Mar. 2021.
International Search Report and Written Opinion for PCT/CN2021/085679; 10 pages; Jan. 6, 2022.
CMCC "Discussion on UE power saving schemes with adaption to UE traffic"; 3GPP TSG RAN WG1 #96 R1-1903344; Athens, Greece; 14 pages; Mar. 1, 2019.
Ericsson "DL Signals and channels for NR-U"; 3GPP TSG-RAN WG1 Meeting #98bis R1-1910945; 24 pages; Aug. 20, 2019.
Office Action for CN Patent Application No. 202180005752.5; Oct. 11, 2024.

* cited by examiner

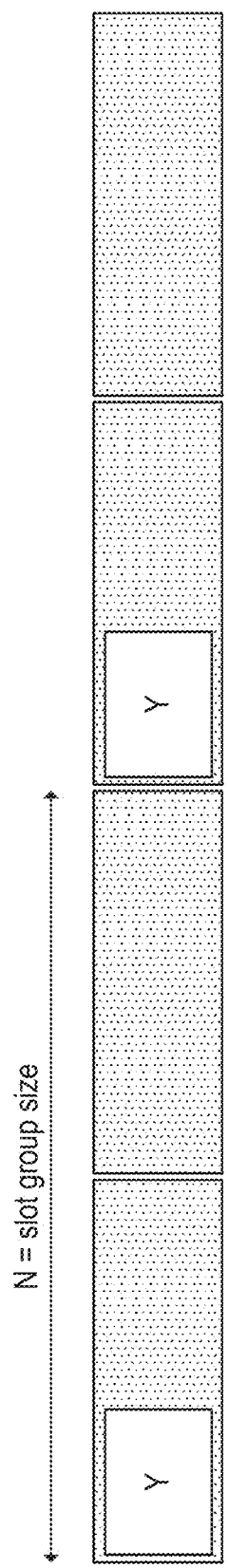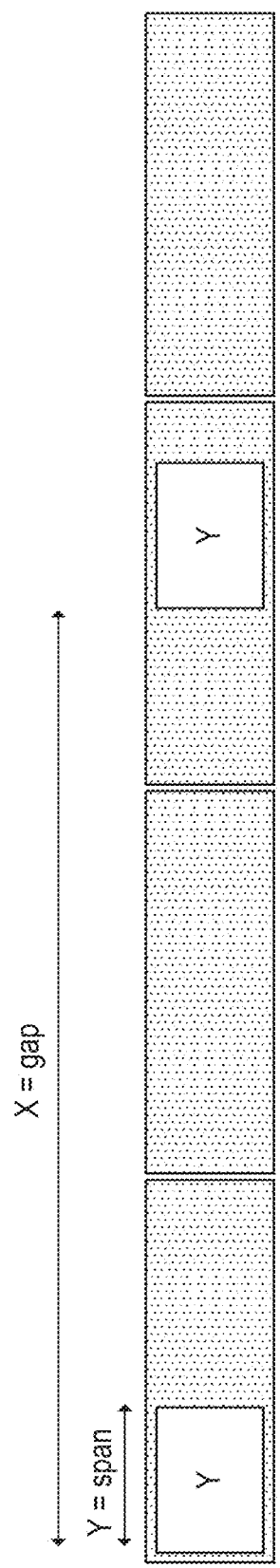

SEARCH SPACE SET SWITCHING

PRIORITY CLAIM INFORMATION

This application is a U.S. National Stage application of International Application No. PCT/CN2021/085679, filed Apr. 6, 2021, titled "Multi-Slot Monitoring Capabilities for High-Frequency Communications", which is hereby incorporated by reference in its entirety.

TECHNICAL FIELD

The present application relates to wireless communication, including to improved capability signaling for high-frequency communications.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be improving capability signaling for high-frequency communications. Improvements in the field are desired.

SUMMARY

Embodiments are presented herein of, inter alia, systems, apparatuses, and methods for capability signaling for high-frequency communications.

As noted above, the number of use cases for wireless networks communicating with different classes of user equipment devices (UEs) with widely variable capabilities and usage expectations are growing. As a result, communicating efficiently with a base station may require a UE to signal its capabilities to the base station. In particular, expansion of cellular communications in to higher frequency ranges, such as ranges above 52.6 GHZ, has resulted in utilization of increased subcarrier spacing sizes, which results in reduced symbol durations. UEs may need new mechanisms to handle such reduced symbol durations, and to signal such capabilities to base stations. Such mechanisms are described herein, along with various systems and apparatuses for implementing such mechanisms.

As an example, a method is disclosed for performing search space set switching. A wireless communication device may monitor for a DCI Format 2_0 message using a first search space set group. The first search space set group may use single-slot monitoring. The wireless communication device may receive the DCI Format 2_0 message. The DCI Format 2_0) message may include an indication for the wireless communication device to switch to monitoring a second search space set group. The second search space set group may use multi-slot monitoring. In response to the indication, the wireless communication device may switch to monitoring the second search space set group instead of the first search space set group.

In some scenarios, the wireless communication device may monitor a third search space set group, concurrently with monitoring for the DCI Format 2_0 message, wherein the third search space set group includes a user equipment (UE)-specific search space and uses single-slot monitoring. The DCI Format 2_0 message may include an indication for the wireless communication device to switch to monitoring a fourth search space set group, wherein the fourth search space set group includes a UE-specific search space and uses multi-slot monitoring. In response to the indication, the wireless communication device may switch to monitoring the fourth search space set group instead of the third search space set group.

In some scenarios, the second search space set group may have a slot group size that is different from a slot group size of the fourth search space set group.

In some scenarios, the wireless communication device may transmit to a base station an indication of first multi-slot monitoring capabilities of the wireless communication device with regard to common search space monitoring, wherein the second search space set group is configured to not exceed the first multi-slot monitoring capabilities. The wireless communication device may transmit to the base station an indication of second multi-slot monitoring capabilities of the wireless communication device with regard to UE-specific search space monitoring, wherein the fourth search space set group is configured to not exceed the second multi-slot monitoring capabilities.

In some scenarios, the first multi-slot monitoring capabilities may include an indication that the wireless communication device can accommodate monitoring of non-contiguous symbols within a multi-slot span of a common search space. The second multi-slot monitoring capabilities may include an indication that the wireless communication device cannot accommodate monitoring of non-contiguous symbols within a multi-slot span of a UE-specific search space.

In some scenarios, the wireless communication device may transmit to a base station an indication of multi-slot monitoring capabilities for each PDCCH type of a plurality of PDCCH types, wherein the second search space set group and the fourth search space set group are configured to not exceed the indicated multi-slot monitoring capabilities. In some such scenarios, the indication of multi-slot monitoring capabilities may further include distinct capabilities for at least one PDCCH type of the plurality of PDCCH types, for each of at least two different sub-carrier spacings.

In some scenarios, switching to monitoring the second search space set group instead of the first search space set group may include: determining a start time of a next slot to begin at least a first predetermined processing time after a slot in which the DCI Format 2_0 message is received; and switching to monitoring the second search space set group instead of the first search space set group as of the determined start time of the next slot.

In some scenarios, switching to monitoring the second search space set group instead of the first search space set group may include: determining a start time of a next multi-slot slot group of the second search space set group, wherein the slot groups of the second search space set group are fixed relative to the start of a subframe structure; and switching to monitoring the second search space set group instead of the first search space set group as of the determined start time of the next multi-slot slot group.

In some scenarios, the wireless communication device may receive, from a base station, an indication of a number of PDCCH categories that are configured for search space set switching. The wireless communication device may also receive, from the base station, an indication of a number of search space set groups configured for each of the PDCCH categories.

In some scenarios, the number of search space set groups configured for a first of the PDCCH categories may be different than the number of search space set groups configured for a second of the PDCCH categories.

In some scenarios, the DCI Format 2_0 message may be received on one beam of a beam sweeping sequence, wherein multiple beams of the beam sweeping sequence carry respective copies of the DCI Format 2_0 within a single slot.

Apparatuses and systems are disclosed for implementing any of the preceding methods, among other methods disclosed herein.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 5a illustrates an example of multi-slot monitoring according to a fixed pattern of N slots, according to some embodiments;

FIG. 5b illustrates an example of multi-slot monitoring according to a fixed pattern having spans of length Y, separated by gaps of length X, according to some embodiments;

Figure 1:
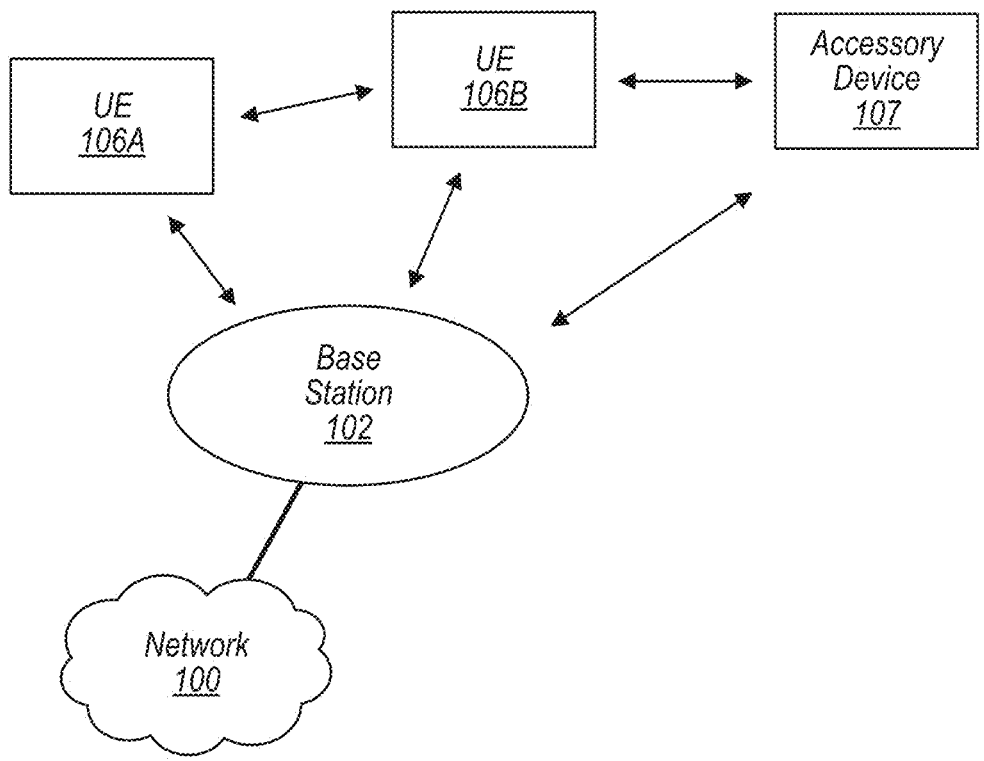
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.

3GPP: Third Generation Partnership Project
CSS: Common Search Space
DCI: Downlink Control Indicator
DL: Downlink
GSM: Global System for Mobile Communications
HARQ: Hybrid Automatic Repeat reQuest
LTE: Long Term Evolution
MAC: Media Access Control
MCS: Modulation and Coding Scheme
PDSCH: Physical Downlink Shared Channel
PUCCH: Physical Uplink Control Channel
PUSCH: Physical Uplink Shared Channel
PxSCH: Refers to either PDSCH or PUSCH
RRC: Radio Resource Control
SCS: Subcarrier Spacing
SSS: Search Space Set
SSSG: Search Space Set Group
UL: Uplink
UMTS: Universal Mobile Telecommunications System
USS: UE-specific Search Space Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
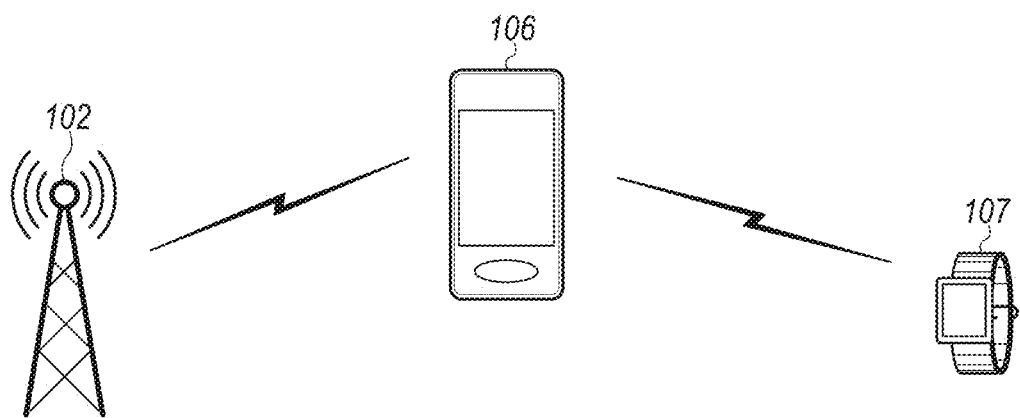
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi®, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth®, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
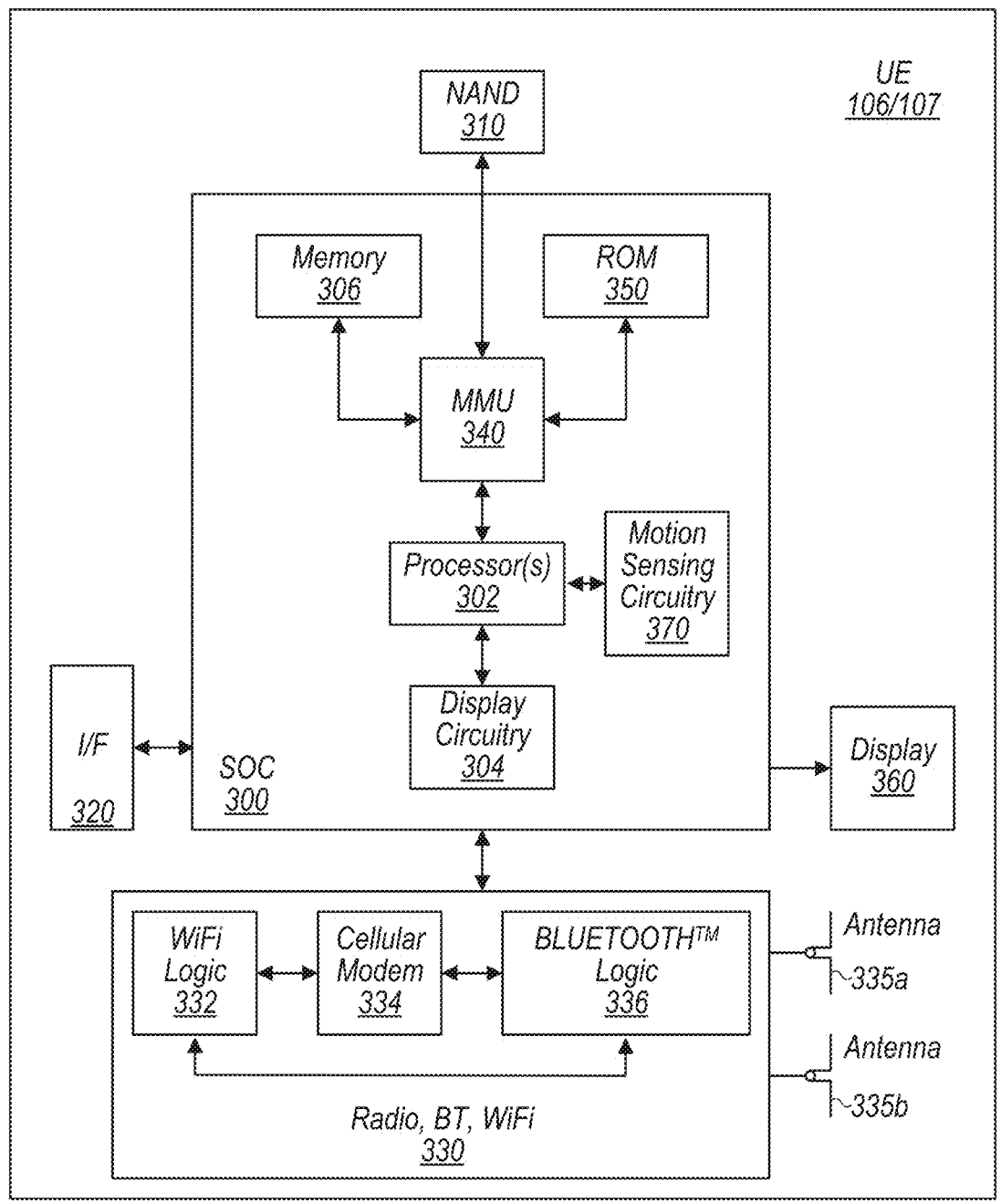
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform improved capability signaling for high-frequency communications according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
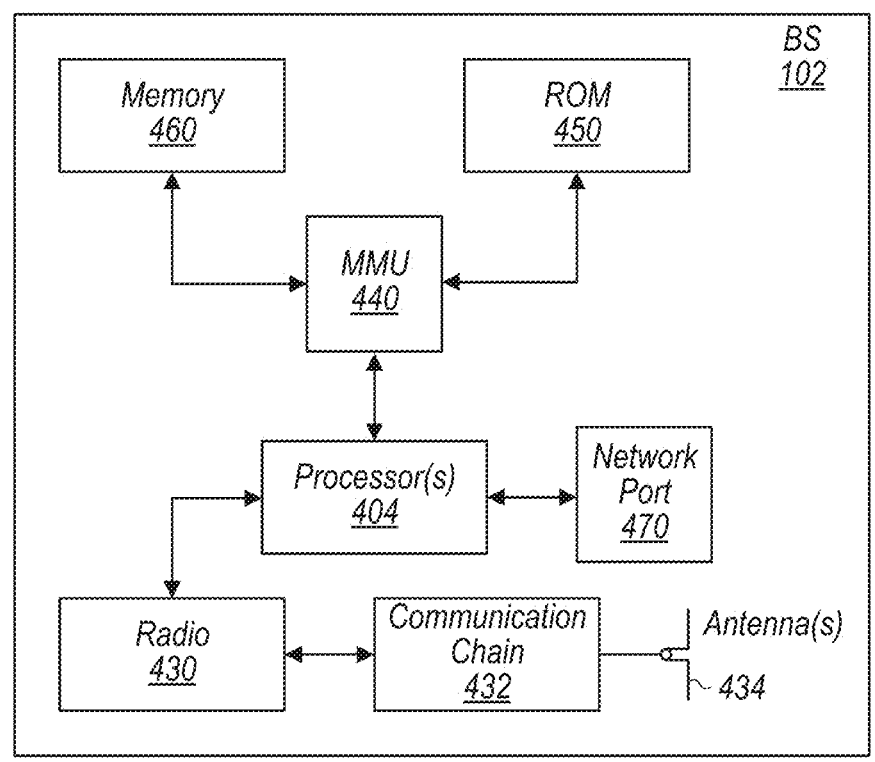
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460) and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of improved capability signaling for high-frequency communications according to various embodiments disclosed herein, and/or any of various other of the features described herein.

Multi-Slot Monitoring Considerations

As cellular communications systems and protocols have transitioned to higher frequencies (e.g., above 52.6 GHZ), increased phase noise has been observed. To counter this, subcarrier spacing (SCS) sizes have been increased. For example, new SCS candidates have been introduced, such as 480 kHz and/or 960 kHz. Using a greater SCS reduces the symbol duration, resulting in a higher number of shorter symbols, relative to communicating the same quantity of data with smaller SCSs (e.g., at lower frequencies).

A base station, such as the base station 102, may transmit physical downlink control channel (PDCCH)/downlink control indicator (DCI) within certain monitoring occasions defined as the control-resource set (CORESET). A UE, such as the UE 106, may perform blind decoding in order to detect the transmitted PDCCH/DCI.

Traditionally, a UE may signal to a base station, e.g., at startup, its capabilities with regard to single-slot PDCCH monitoring (SSM), in which the UE monitors each slot for PDCCH/DCI. However, with more frequent symbols, resulting from larger SCSs, performing blind decoding to monitor for PDCCH/DCI in every symbol may be unduly burdensome for the UE. As a result, the UE may signal to the base station its capabilities with regard to multi-slot PDCCH monitoring (MSM). Such MSM capability signaling may provide an indication of how often the UE is capable of monitoring for PDCCH/DCI across a number of slots.

Once the base station has been informed of the UE's capabilities, the base station may specify a PDCCH search space set (SSS) configuration for the UE. Such a search space set defines a set of resources in the downlink resource grid where PDCCH/DCI of a certain type may be carried. A search space set group (SSSG) may define a group of search spaces configured for different PDCCH/DCI types. The UE may restrict its blind decoding to the SSSG, to try to find PDCCH/DCI.

There are two broad types of search space, which may be referred to as UE-specific search space (USS) and common search space (CSS). A USS may be dedicated for a specific UE, and a DCI carrying information specific to that UE may be transmitted within that USS. The UE may be informed of an applicable USS by the base station, e.g., via an RRC signaling message. However, this requires the UE to complete RRC establishment before it can receive information regarding the USS.

A CSS may be searched by multiple (e.g., all) UEs within range. A UE may search the CSS prior to completing RRC establishment. For example, a PDCCH carrying information for use during a RACH procedure may be located within the CSS. As specific examples, a DCI carrying initial access information (e.g., DCI Types 0, 0A, 1), a DCI carrying paging information (e.g., DCI Type 2), and/or a DCI of Type 3 may be transmitted within a CSS.

In some implementations, greater flexibility is desired in signaling MSM capabilities, as well as in defining dynamic search space set adaptation. Various improvements in these areas are discussed below.

FIGS. 5-8: Defining Multi-Slot PDCCH Monitoring Capability

As noted above, with a high SCS, monitoring for PDCCH in every symbol may be unduly burdensome for a UE. As a result, a UE may signal its MSM capabilities to a base station. Such signaling may be performed in a variety of ways.

As a first approach, the UE may signal that it is capable of MSM according to a fixed pattern having a span of Y consecutive time windows (e.g., symbols or slots) within a slot group of N slots. FIG. 5a illustrates an example of monitoring according to such a fixed pattern, in which N=2. In the example of FIG. 5a, the UE may monitor for PDCCH/DCI during the span Y within only a single (e.g., first) slot of the slot group. The base station may include PDCCH/DCI only within the span Y within that single (e.g., first) slot of a slot group, and may not include PDCCH/DCI in other slots of the slot group.

The UE may signal its MSM capabilities to the base station according to any appropriate means. For example, the UE may provide a value of N, indicating a minimum number of slots it can support in the slot group, and/or a value of Y, indicating a maximum number of time windows (e.g., symbols or slots) it can support in the span. Alternatively, or additionally, the UE may provide a maximum number of blind decodes (BD) and/or control channel entities (CCE) the UE can accommodate within a slot group (i.e., within the span of the slot group). As another example, the UE may provide an index value that may indicate a minimum value of N, a maximum value of Y, and/or a BD/CCE budget, e.g., by indexing an entry in a table of capability values. In some scenarios, the MSM capabilities signaled by the UE may depend upon configuration details of the base station, such as subcarrier spacing. For example, with a subcarrier spacing of 480 kHz, the UE may be able to accommodate a minimum slot group size of N=4, while with a subcarrier spacing of 960 kHz, the UE may be able to accommodate a minimum slot group size of N=8. These values are merely examples, and other values are also envisioned.

In some implementations, the value of Y may be fixed, while in other implementations, the value of Y may be set by the base station, e.g., based on the MSM capabilities signaled by the UE. In some implementations, the base station may be constrained to adapt to capabilities signaled by the UE. Although FIG. 5a illustrates Y as smaller than a slot (e.g., as a number of symbols less than the total number of symbols in the slot), in other examples Y may include a number of symbols greater than a slot, or may include multiple slots.

In response to receiving an indication of the UE's capabilities, the base station may determine appropriate values of N and/or Y, and may use the determined values to generate one or more SSSs for the UE. The generated SSSs may be generated as to accommodate the UE's MSM capabilities (e.g., as to not exceed the UE's MSM capabilities).

In some implementations, the monitoring occasions within a span defined by the base station may be constrained to include a limited number of payload scheduling DCIs. For example, the span may be limited to including one unicast DCI scheduling DL PDSCH transmission (either single-PDSCH or multi-PDSCH transmission) and one unicast DCI scheduling UL multi-PUSCH transmission per scheduled CC for FDD. As another example, the span may be limited to including one unicast DCI scheduling DL multi-PDSCH transmission and two unicast DCI scheduling UL Multi-PUSCH transmissions per scheduled CC for TDD. As another example, the span may be limited to including two unicast DCI scheduling DL multi-PDSCH transmission and one unicast DCI scheduling UL Multi-PUSCH transmissions per scheduled CC for TDD.

As a second approach, the UE may signal that it is capable of MSM according to a fixed pattern having spans of Y consecutive time windows (e.g., symbols or slots), wherein the spans are separated based on a minimum time gap of X time windows (e.g., symbols or slots). For example, the time gap X may indicate the time from the start of one span to the start of the next span. This may provide additional flexibility relative to the first approach, in that the gap X may, in some scenarios, indicate a number of symbols that may cause the spans to repeat at intervals that do not line up with slots. In some implementations, this may allow a span Y to cross a slot boundary. In other implementations, X and Y may be constrained such that Y does not cross slot boundaries.

FIG. 5b illustrates an example of monitoring according to such a fixed pattern, in which X=35 symbols. In the example of FIG. 5b, the UE may monitor for PDCCH/DCI during each occurrence of the span Y. The base station may include a PDCCH/DCI only within the span Y, and may not include PDCCH/DCI in other symbols.

The UE may signal its MSM capabilities to the base station according to any appropriate means, such as those described above. For example, the UE may provide a value of X, indicating a minimum time gap (e.g., expressed in symbols, slots, or other units) it can support between spans; a maximum value of Y; a BD/CCE budget: an index value; etc. In some scenarios, a value of X (or associated index, etc.) signaled by the UE may depend upon configuration details of the base station, such as subcarrier spacing, e.g., in a manner similar to that discussed above in connection with the value of N.

In response to receiving an indication of the UE's capabilities, the base station may determine appropriate values of X and/or Y, and may use the determined values to generate one or more SSSs for the UE. The generated SSSs may be generated as to accommodate the UE's MSM capabilities.

As a third approach, the UE may signal that it is capable of MSM according to a sliding window of N slots containing one or more spans. This may give more flexibility to the base station by allowing sliding windows to begin at different times for various UEs, while maintaining a fixed pattern for common search space transmissions.

Figure 6:
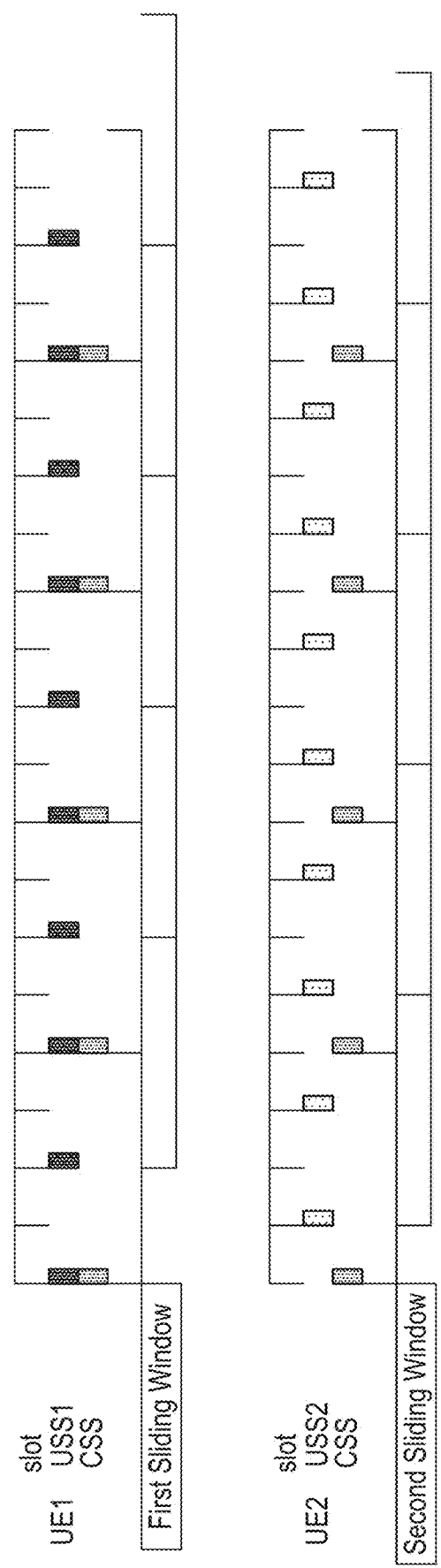
FIG. 6 illustrates an example of multi-slot monitoring utilizing two sliding windows, according to some embodiments.

FIG. 6 illustrates an example of two sliding windows of N slots allocated according to such an arrangement. As illustrated, the first sliding window is allocated to UE1, while the second sliding window is allocated to UE2. In this example, a CSS occurs at the same time for both UEs, in every fourth slot. This is because a CSS may carry PDCCH/DCI intended for all UEs. By contrast, USSs occur in the sliding windows, in every second slot. Specifically, in the example of FIG. 6, the sliding window includes a USS including resources in the first slot and the third slot of each sliding window. However, because the first sliding window and the second sliding window begin at different times, their respective search spaces are offset from each other. Additionally, in the example of FIG. 6, the second sliding window is also offset from the CSS, such that the USS of UE2 does not occur in the same slot as the CSS. The ability to offset the search spaces in this manner may provide greater flexibility to the base station in scheduling PDCCH/DCI for specific UEs. However, use of a sliding window may introduce undue complexity for the UE.

In light of the limitations of these three approaches, further improvements are desired to implement a fixed-pattern approach that offers greater flexibility, including some of the flexibility introduced by the sliding window approach. Such improvements may introduce need for further capability signaling by the UE.

As a first example, if a fixed pattern includes a span Y having a length specified as a number of slots, then the UE may further define its MSM capabilities relative to a mapping of symbols within those slots. Specifically, when the span Y includes multiple slots, the UE may be capable of monitoring only a subset Z of the symbols within those slots. When signaling its MSM capabilities to the base station, the UE may include an indication of its capabilities with regard to monitoring the subset Z of symbols.

FIGS. 7a and 7b illustrate two examples of fixed patterns, each having a span of two slots and a gap of four slots (or 56 symbols). In the example of FIG. 7a, the subset Z of symbols within the span constitutes a subset of contiguous symbols. This subset of contiguous symbols may be constrained to be the first Z symbols within the span, in some implementations, or, in other implementations, may be a subset of Z contiguous symbols occurring elsewhere in the span. By contrast, FIG. 7b illustrates an example in which the subset Z includes non-contiguous symbols within the span. In some scenarios, the UE may provide to the base station an indication of whether it is capable of supporting a non-contiguous subset Z, as in FIG. 7b, or whether it is capable only of supporting a contiguous subset Z, as in FIG. 7a. In some scenarios, the UE may also, or alternatively, indicate a number of symbols Z it can support within the span. As described above, one or more of these capabilities may be indicated to the base station explicitly and/or one or more capabilities may be indicated as an index to a table of capability values.

In some implementations, single slot span monitoring with X less than a slot may not be supported at high SCSs, due to the short duration of the symbols. The use of single slot monitoring with X equal to a slot (or per-slot monitoring) may be supported. In such implementations, the BD/CCE budget may be carefully selected so as not to increase the UE complexity. Too small a value would prevent the use of larger PDCCH aggregation levels.

Longer durations and/or MSM may not be supported for the 120 KHz SCS.

In some implementations, the UE may indicate to the base station a number of unicast DCIs it can accommodate within a span as a capability.

Figure 8:
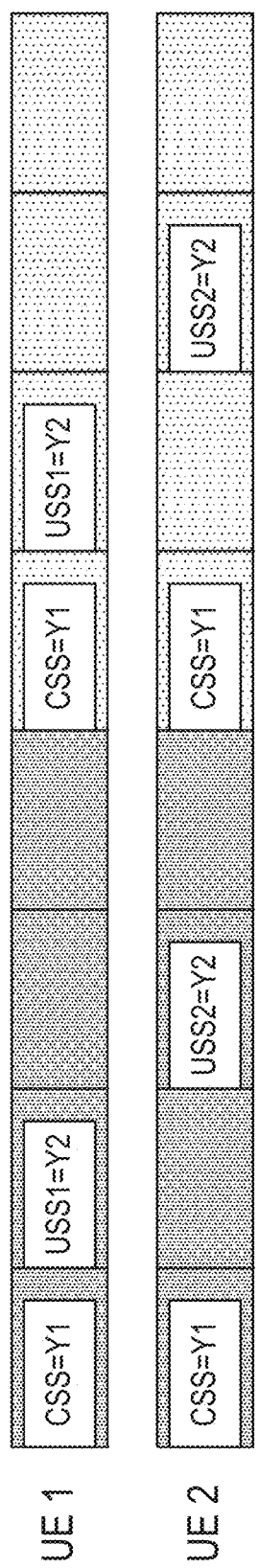
FIG. 8 illustrates an example of multi-slot monitoring according to a fixed pattern, in which two UEs monitor a shared common search space (CSS) and distinct UE-specific search spaces (USSs), according to some embodiments.

As a second example, a fixed pattern may be configured for CSS, and a separate fixed pattern may be configured for USS. In some implementations, a separate fixed pattern may be configured for USS for each UE. FIG. 8 illustrates an example of this arrangement. As shown in FIG. 8, a CSS is defined according to a first fixed pattern having a slot group size (or a gap size) of 4 slots, with a span Y1 occurring within the first slot of the slot group. The CSS is monitored by a first UE (UE1) and a second UE (UE2).

A first USS (USS1) is defined for UE1 according to a second fixed pattern also having a slot group size of 4 slots, but with a span Y2 occurring in the second slot of the slot group. A second USS (USS2) is defined for UE2 according to a third fixed pattern also having a slot group size of 4 slots, but with the span Y2 occurring in the third slot of the slot group. Thus, the base station may have flexibility to schedule the CSS separately from the one or more USSs, and may also have flexibility to separately schedule multiple USSs for different UEs.

In some scenarios, Y2 may be different than Y1, e.g., in span length, applicable values of subset Z, etc. In some scenarios, USS2 may be defined according to a fixed pattern having a span Y3, which is different from Y2, as used by USS1. In some scenarios, Y1, Y2, and/or Y3 may overlap in time. In some scenarios, the CSS, USS1, and/or USS2 may have different slot group sizes.

In some implementations, when indicating its MSM capabilities to the base station, a UE, such as UE1 of FIG. 8, may indicate a BD/CCE budget it can accommodate within Y1 and Y2. For example, the UE may provide a first indication of the BD/CCE budget it can accommodate within Y1, and may provide a second indication of the BD/CCE budget it can accommodate within Y2. As another example, the UE may provide a single indication of the BD/CCE budget it can accommodate within both Y1 and Y2.

In some implementations, the UE may indicate a maximum Y1 it can accommodate and a maximum Y2 value it can accommodate. In some implementations, the UE may indicate a single value of the maximum total span it can accommodate within Y1 and Y2. In some scenarios, the UE may indicate a maximum Y1 value it can accommodate and a maximum Y2 value it can accommodate, and may further indicate a maximum total span it can accommodate within Y1 and Y2, which may be smaller than the sum of the indicated maximum Y1 and the indicated maximum Y2 value. In some implementations, a maximum value may be set, such that the sum of the value of Y1 and the value of Y2 may not exceed the constant. In some implementations, CSS may be constrained such that Y1 cannot exceed Y2.

In some implementations, span Y2 may be constrained to occur at a fixed time offset, relative to span Y1. For example, USS1 may occur in the slot following CSS, as illustrated in FIG. 8. In some implementations, the fixed time may be different for each UE, such that USS1 may occur at a different time than USS2, as illustrated in FIG. 8.

In some implementations, CSS may not be allowed on higher SCS values, such that the UE may indicate its capabilities only with regard to USS. In implementations in which CSS is allowed, the UE may not monitor C-RNTI, etc., on the SCELL.

As described previously, in some configurations, a UE may monitor only a subset Z of the symbols within a span Y. In some scenarios, spans within a CSS fixed pattern (such as Y1) may be configured to include a subset Z that includes non-contiguous symbols, e.g., as illustrated in FIG. 7b, while spans within a USS fixed pattern (such as Y2) may be configured to include a subset Z that includes only contiguous symbols, e.g., as illustrated in FIG. 7a. This may provide flexibility to the base station for transmitting CSS, while avoiding undue burden on the UE in monitoring the USS.

As a third example, a base station may, in some scenarios, allocate a greater BD/CCE budget that the UE signaled. For example, the base station may allocate to the UE one or more SSSs that include more resources than the UE is capable of monitoring. This may be referred to as "overbooking" the UE. This may pose additional complications in MSM implementations, as compared to purely SSM implementations.

In some implementations, the base station may be barred from overbooking CSS, but may be allowed to overbook USS. For example, in various implementations, the base station may be allowed to overbook on all spans, or on a subset of the spans in a pre-defined multi-slot duration, or on only the first span in a pre-defined multi-slot duration.

When a UE determines that it has been overbooked, it may respond by eliminating at least a portion of the allocated search spaces. For example, in some implementations, if the UE determines that a span has been overbooked, the UE may respond by eliminating all slots for search spaces in the span. E.g., the UE may forego monitoring within the span. As another example, the UE may eliminate allocated resources (e.g., forego monitoring those resources) one slot at a time, until the total allocated resources fit within the UE's budget. As yet another example, the UE may eliminate allocated resources one symbol at a time until the total allocated resources fit within the UE's budget.

As a fourth example, MSM may introduce additional complications in connection with carrier aggregation (CA). For example, if multiple component carriers (CCs) have the same SCS, but different span sizes, or different slot group sizes, estimating a UE's budget may be more complicated. In some implementations, using different span/slot group sizes across multiple carriers having the same SCS may therefore be disallowed. In other implementations, each group of carriers having the same span size, or slot group size, may be treated as a separate group for estimating the UE's budget. In various implementations, the UE may indicate to the base station either a combined budget for the groups or a separate budget for each group. The base station may generate one or more SSSs to the UE, allocating resources to each group, e.g., proportionally.

In some implementations, overbooking may be performed for each group separately.

In some implementations, if more than one unicast PDSCH is transmitted to the UE (per CC), it may be time-division-multiplexed (TDM). The UE may not receive more than one unicast PDSCH at a time (per CC).

In some implementations, the base station may be disallowed to schedule out-of-order multi-PDSCH/PUSCH (PxSCH) transmissions. For example, if any additional PxSCH transmission is scheduled, the current multi-PDSCH transmission may be canceled. No new PxSCH may be scheduled until all the PDSCH transmissions are completed. In some implementations, the base station may be disallowed to schedule PxSCH transmissions that allow out of order HARQ transmission, such as a single or multi-PDSCH transmission B that occurs after a single or multi-PDSCH transmission A may be constrained to schedule its HARQ-ACK(s) after the HARQ-ACK(s) of transmission A.

In cross-carrier scheduling, a DCI on one CC may schedule a PxSCH on another CC. Given the possible increase in the bandwidth of the different transmissions, and the increase in data rate for high SCSs, the number of carriers that can be simultaneously scheduled from a single carrier, may in some implementations, be indicated as a UE capability. For example, the base station may indicate a number of simultaneously scheduled carriers, e.g., using a configurable Carrier Indicator in DCI format 0_2/1_2. For DCI format 0_1/1_1, as it is fixed at 0 and 3 bits, the base station may transmit 3-bits but use only up to the configured number of carriers. The UE may indicate a capability on the maximum number of carriers that can be scheduled from a single carrier.

In some scenarios, MSM may also benefit from updates to the HARQ procedures. For example, in a scenario with different numerologies between PDSCH and PUCCH, a large differential between the SCSs may result in a need for an increase in the number of HARQ processes. In one simple example, if a transmission occurs such that the HARQ is on FR1 with the SCS set to 15 kHz (which is equivalent to 32 480 kHz slots), then a frame structure of DDDSU would require an aggregation of up to 96 slots. The maximum differential changes from 8 (120 kHz to 15 kHz) to 64 (960 kHz to 15 kHz).

Various options are available to address this issue. For example, the number of HARQ processes may be increased. As another example, the differential ratio between SCSs of PDCCH and PUCCH may be limited. As yet another example, the PUCCH may be limited to FR2 at a maximum and not allowed to be transmitted in the FR1 band, which would cause a large SCS differential. As yet another example, bundling of HARQ elements may be allowed.

Figure 9:
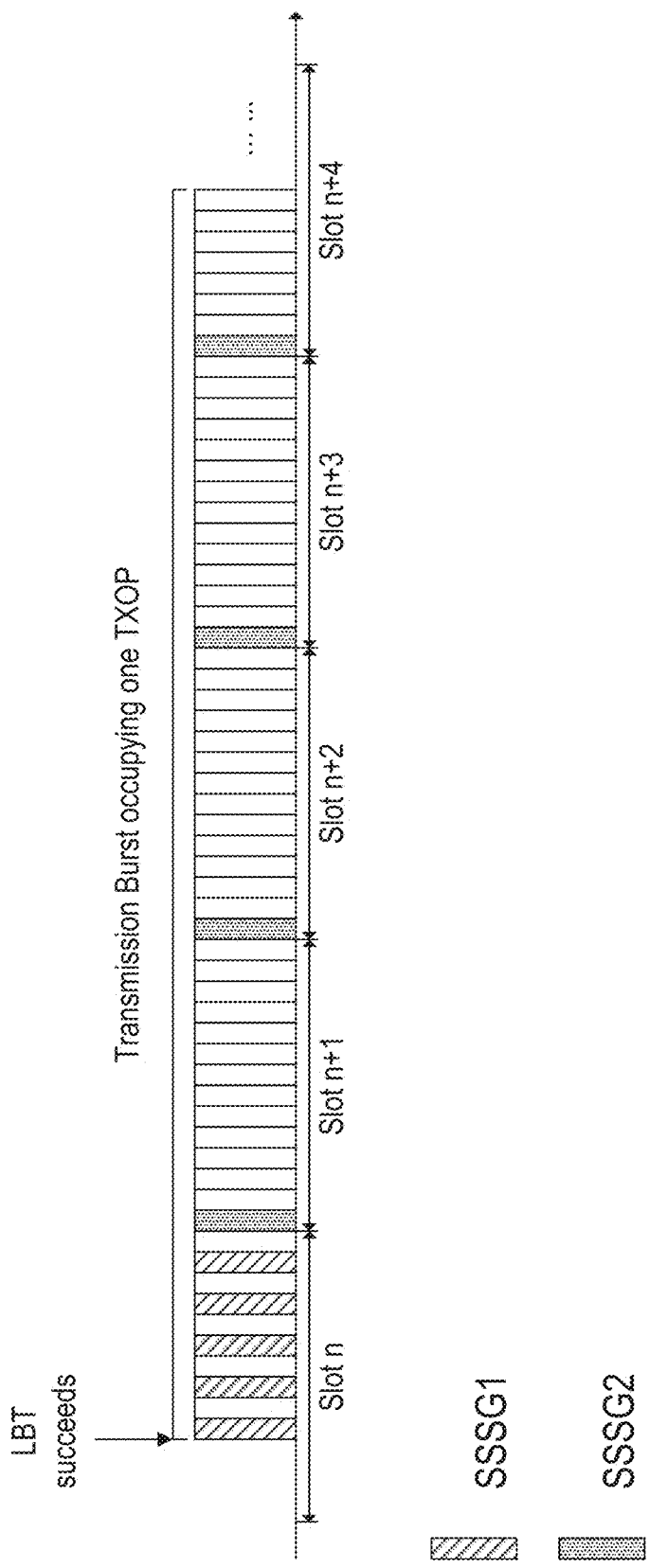
FIG. 9 illustrates an example of two search space set groups (SSSGs) within a transmission burst occupying one transmission opportunity, according to some embodiments.
Figure 10:
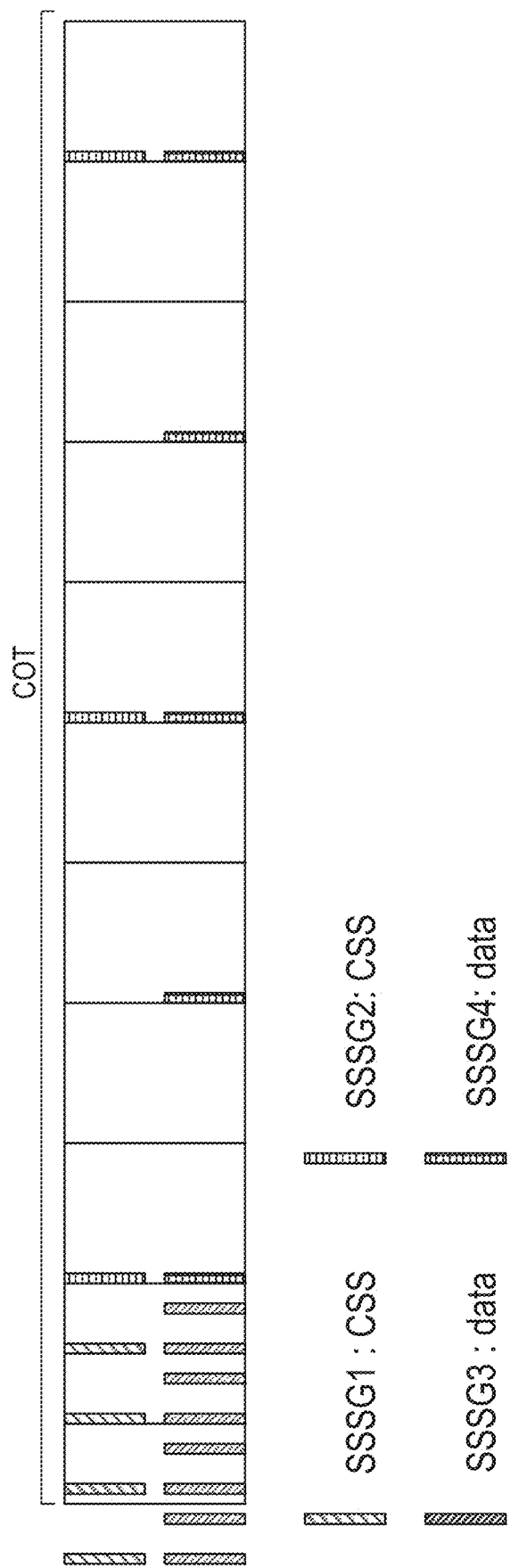
FIG. 10 illustrates an example of switching between two search space set groups defined to include CSS and switching between two search space set groups defined to include USS, according to some embodiments.

FIGS. 9-11—Multi-Slot Monitoring with Multiple Search Space Sets

In some scenarios, improvements are desired to allow greater support of dynamic search space set adaptation. For example, in some configurations, such as in NRU, a UE may compete for channel access, e.g., using a listen-before-talk (LBT) procedure. As a result, the UE may gain control of the channel at a time other than at a slot boundary. In some common implementations, a SSS assigned to the UE may be limited to resources within one fixed symbol of a slot, e.g., the first symbol. As a result, upon gaining channel access, a UE may waste a significant portion of a slot, while waiting for the first occurrence of the SSS, e.g., at the start of the next slot.

To avoid such waste, a base station may assign multiple SSSGs to a UE, each SSSG having a different configuration. The UE may be configured to dynamically switch between these SSSGs.

FIG. 9 illustrates an example of two SSSGs within a transmission burst occupying one transmission opportunity (TXOP). As illustrated, SSSG1 includes every second symbol within the slot (e.g., within Slot N), while SSSG2 includes only the first symbol of the slot (e.g., within Slot N+1 through Slot N+4). As illustrated, the UE may utilize SSSG1 during the remainder of the first slot upon gaining channel access, to allow reception of PDCCH/DCI quickly. The UE may then switch to SSSG2 at the next slot boundary, so as to reduce its monitoring burden. Other group arrangements are also envisioned. For example, SSSG1 may include every symbol. As another example, SSSG2 may include multiple symbols within a slot. In some scenarios, selection of a SSSG may be configured per bandwidth part (BWP).

Traditionally, only two SSSGs could be assigned to a given UE. However, additional search space sets, such as CSS sets, may be outside the configured groups, and may be monitored by the UE regardless of which SSSG is currently selected.

In various implementations, switching between groups may be triggered either explicitly or implicitly. For example, in a traditional scenario utilizing two SSSGs, a timer (e.g., searchSpaceSwitchTimer) may be configured as a number of slots, which may be decremented once per slot, e.g., at the end of each slot. The UE may monitor for the presence of a monitoring group flag, e.g., in DCI format 2_0. The presence of the flag may constitute explicit signaling. If the flag is set to a first value (e.g., 1), then the UE may switch to (or continue) monitoring of SSSG2 at the next applicable slot boundary, with respect to the detected DCI format 2_0. The UE may also start (or restart) the configurable timer. If the flag is set to a second value (e.g., 0), then the UE may switch to (or continue) monitoring SSSG1 at the next applicable slot boundary with respect to detected DCI format 2_0.

If the flag is not present, or if the UE does not monitor for DCI format 2_0, then implicit switching may be used. With implicit switching, if any PDCCH in SSSG1 is successfully detected, then the UE may switch from monitoring SSSG1 to monitoring SSSG2 at the next applicable slot boundary with respect to the detected PDCCH. The UE may also start (or restart) the configurable timer. The UE may switch from SSSG2 to SSSG1 at the earliest slot boundary that is at least P2 symbols after (1) the end of the slot in which the timer expires, or (2) an indicated COT duration is exceeded.

The "next applicable slot boundary" may be defined as the earliest start of a slot that is at least P1/P2 symbols later than the last symbol of the corresponding PDCCH. P1 may be a number of symbols that is no less than a predetermined processing time required by the UE to perform switching from SSSG1 to SSSG2, and P2 may be a number of symbols that is no less than a predetermined processing time required by the UE to perform switching from SSSG2 to SSSG1.

In some scenarios, a UE may perform a mix of SSM and MSM, which may introduce additional complexity with regard to search space set switching. For example, a UE may utilize SSM for a first set of one or more BWPs, while utilizing MSM for a second, different, set of one or more BWPs. This may be referred to as BWP switching. As another example, a UE may utilize SSM for a first set of one or more search space sets, while utilizing MSM for a second, different, set of one or more search space sets. This may be referred to as search space set switching.

One example implementation includes utilizing SSM at the beginning of a channel occupancy time (COT) during unlicensed channel access, e.g., during an initial one or more slots following channel access, then utilizing MSM in subsequent slots.

As noted above, utilizing both SSM and MSM may introduce increased complexity. For example, when utilizing MSM, different DCI types may utilize different slot granularities (e.g., different slot group sizes or gap X size), which may prevent those DCI types from being included in a single SSSG. Similarly, multiple search space set configurations may be allowed for different DCI types. As another example, additional mechanisms may be needed for switching between different MSM configurations. As yet another example, additional mechanisms may be needed to define where in a COT switching may occur, relative to the subframe. Various techniques will now be presented to address these and other technical difficulties.

As noted above, the UE may need to support both SSM and MSM, with different slot-group sizes and/or spans, e.g., according to any of the preceding examples. However, SSM may pose an undue complexity burden on the UE when operating with high SCSs. To address this issue, the UE may signal different SSM and MSM capabilities for different DCI types.

For example, as a first option, the UE may indicate to the base station that it does not support SSM at all (e.g., at the applicable SCS).

As a second option, the UE may indicate that it does support SSM for specific PDCCH/DCI types. For example, the UE may indicate that it supports SSM for CSS PDCCH/DCI only. This may include PDCCH Types 0, 0A, 1, 2, and/or 3.

As a third option, the UE may indicate a specific level of monitoring for specific PDCCH/DCI types. For example, the UE may indicate that, for a particular DCI type (or for each available DCI type), it supports single slot, MSM over 2 slots, MSM over 4 slots, etc. As a specific example, a particular UE may indicate that it supports SSM for DCI Types 0, 0A, 1, and 2; that it supports 2-slot MSM for DCI Type 3; and that it supports 4-slot MSM for USS. This configuration is one example, and it should be understood that other configurations are also envisioned.

As a fourth option, the UE may indicate a specific level of PDCCH monitoring for specific DCI types, at specific sub-carrier spacings. As a specific example, a particular UE may indicate that, for subcarrier spacing of 480 kHz, it supports SSM for DCI Types 0, 0A, 1, and 2; that it supports 2-slot MSM for DCI Type 3; and that it supports 4-slot MSM for UE-specific search space(s). In this example, the UE may further indicate that, for subcarrier spacing of 960 KHz, it supports SSM for DCI Types 0 and 0A; that it supports 2-slot MSM for DCI Types 1 and 2; that it supports 4-slot MSM for DCI Type 3; and that it supports 8-slot MSM for USS. This configuration is one example, and it should be understood that other configurations are also envisioned.

Table 1 illustrates various examples of possible UE configurations for supporting SSM and MSM for various DCI types. These examples illustrate differing levels of compromise between flexibility and complexity burden on the UE.

TABLE 1

|  | Single-Slot | Multi-Slot |
|---|---|---|
| Alt 1: SMS is not supported for UE-specific search space | Type 0, 0A, 1, 2, 3 | C-RNTI, MCS-C-RNTI, CS-RNTI |
| Alt 2: SMS is not supported for C-type RNTI | Type 0, 0A, 1, 2, 3 (except Cx-RNTI for Type 3) | C-RNTI, MCS-C-RNTI, CS-RNTI (USS or Type 3) |
| Alt 3: SMS is used only for initial access (SI and paging) | Type 0, 0A, 1, {DCI 2_0} | C-RNTI, MCS-C-RNTI, CS-RNTI (USS or Type 3) P-RNTI (Type 2), All Type 3 {except DCI 2_0} |

A specific configuration to be used by a UE for each DCI-type may be indicated by the gNB e.g., by (a) BWP switching (b) explicit search space set switching or (c) implicit search space set switching.

As noted above, search space set switching has traditionally been applied only to USS and CSS Type 3, while other CSS types were monitored by all UEs, and was therefore not included in the configured groups. However, with multi-slot monitoring capabilities, in which a UE may switch to MSM within a COT, some types of PDCCH/DCI that are typically included in CSS, such as DCI Format 2_0, may also be configured to change search space granularity, e.g., based on whether a UE is inside or outside of a COT.

For example, in order for the UE to obtain information regarding a COT, the UE must receive DCI Format 2_0 before the COT begins. However, once inside the COT, if the USS is set to MSM, then DCI Format 2_0 may also be needed less frequently: e.g., at intervals of the slot group size used for the MSM of the USS.

To provide such flexibility, the base station may define multiple SSSGs per DCI type. For example, the base station may define two (or more) SSSGs for DCI Format 2_0 and a different two (or more) SSSGs for data transmission DCI. In other implementations, this may be broadened such that the base station may define multiple SSSGs for CSS and different multiple SSSGs for USS.

FIG. 10 illustrates an example of two SSSGs (SSSG1, SSSG2) defined to include CSS, which may include DCI Format 2_0, and two SSSGs (SSSG3, SSSG4) defined to include USS, which may include data-type DCIs, such as C-RNTI. As illustrated, the UE may initially utilize SSM to monitor SSSG1 for DCI Format 2_0. As illustrated, SSSG1 includes multiple symbols, but any SSM configuration may be possible. Similarly, the UE may initially utilize SSM to monitor SSSG3 for one or more DCI types in the USS. As illustrated, SSSG3 includes multiple symbols, but any SSM configuration may be possible.

Upon entering the COT, the UE may detect one or more DCI Format 2_0 within one or more monitoring opportunities of SSSG1. In response, at the start of the next full multi-slot slot group, the UE may transition to utilizing MSM to monitor SSSG2 for DCI Format 2_0. As illustrated, SSSG2 has a slot group size of four slots, which may reduce the monitoring burden on the UE. In other examples, any appropriate slot group size may be used.

Similarly, upon entering the COT, the UE may also detect one or more data type DCI within one or more monitoring opportunities of SSSG3. In response, at the start of the next full multi-slot slot group, the UE may transition to utilizing MSM to monitor SSSG4 for one or more DCI types in the USS. As illustrated, SSSG4 has a slot group size of two slots, which may reduce the monitoring burden on the UE. In other examples, any appropriate slot group size may be used.

Figure 7:
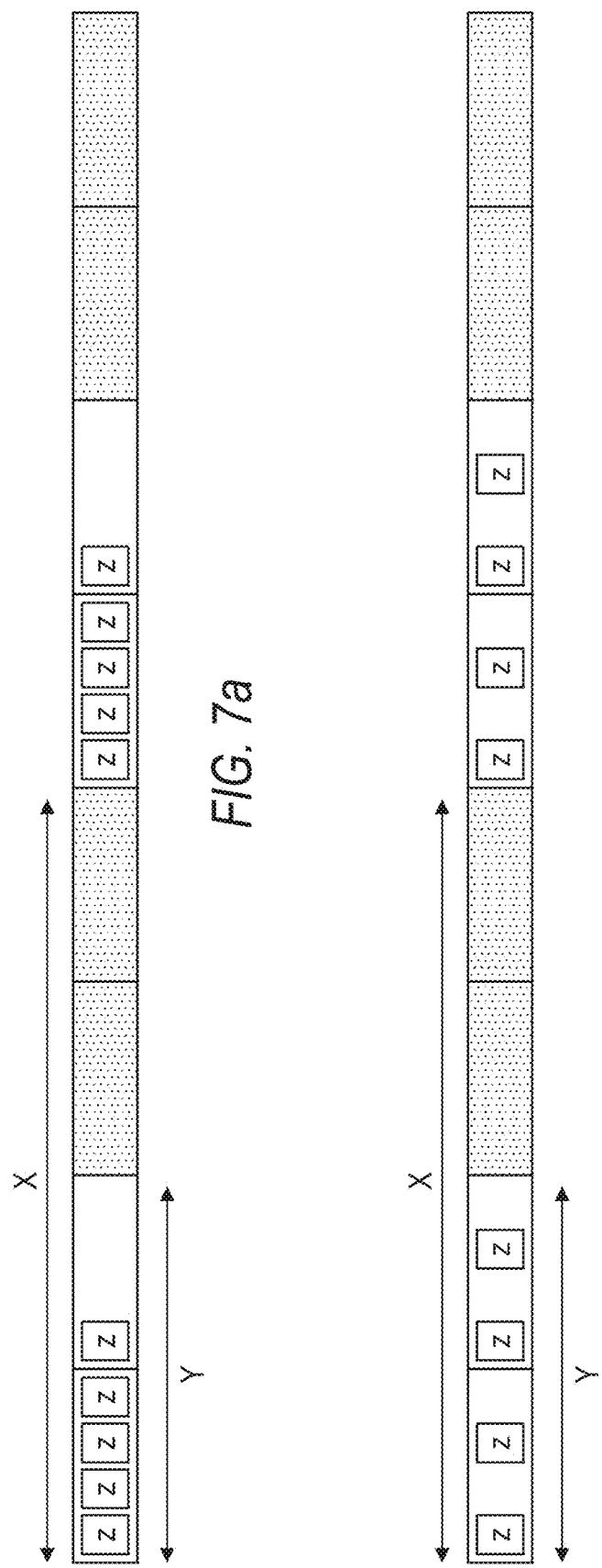
FIG. 7a illustrates an example of multi-slot monitoring according to a fixed pattern having Z consecutive symbols within a span of length Y, according to some embodiments.
FIG. 7b illustrates an example of multi-slot monitoring according to a fixed pattern having Z nonconsecutive symbols within a span of length Y, according to some embodiments.

Multi-slot SSSGs such as SSSG2 and/or SSSG4 may be configured according to any of the preceding examples, including the examples of FIG. 7 and FIG. 8, or other appropriate formats.

More generally, the base station may define and communicate to the UE, e.g., via RRC message(s), a number of PDCCH/DCI categories that are configured for search space set switching. For example, a first category may be defined to include USS DCIs, a second category may be defined to include DCI Format 2_0, a third category may be defined to include paging DCIs (e.g., PDCCH Type 2), etc.

The base station may further define and communicate to the UE, e.g., via RRC message(s), the number of SSSGs defined for each DCI type. For example, as illustrated in FIG. 10, for a given DCI type, the base station may define a first SSSG for use outside the COT, which may continue to be used within the COT, e.g., until the start of the first full multi-slot slot group, and may define a second SSSG for use within the COT, following the start of the first full multi-slot slot group. As another example, the base station may define a first SSSG for use outside the COT, a second SSSG for use from the start of the COT until the start of the first full multi-slot slot group, and a third SSSG for use within the COT, following the start of the first full multi-slot slot group. Other numbers and uses of SSSGs are also possible for a given DCI type.

In some implementations, the number of SSSGs defined may be the same for all DCI types. In other implementations, the number of SSSGs defined may be different and/or independent for some or all of the DCI types.

In some implementations, the base station may use UE group signaling, such as in DCI Format 2_0, to indicate search space set switching for any/all SSSG, e.g., when explicit switching is supported. In some implementations, a new DCI format may be used. In various scenarios, monitoring of a first DCI type may be switched from SSM to MSM at the same time, or at a different time than monitoring of a second DCI type.

Switching from SSM to MSM following channel access may occur according to various configurations. For example, switching from SSM to MSM may be performed by switching from a first SSSG, which is configured for SSM, to a second SSSG, which is configured for MSM. Such switching may be performed in the manner described above for switching between SSSGs, but may be modified in any of various ways to accommodate multi-slot groups. For example, the searchSpaceSwitchTimer may be set in units of either slots or multi-slots, in various implementations. For example, with a SCS of 15 kHz, the searchSpaceSwitchTimer may be set to a number of slots, with values in the range {1 . . . 20}, while a SCS of 30 kHz may allow a number of slots in the range {1 . . . 40}, and a SCS of 60 KHz may allow a number of slots in the range {1 . . . 80}. Extending this pattern to higher SCS values may result in a number of slots for a SCS of 960 kHz being in the range {1 . . . 1280}. To reduce this range, the values may instead by set in units of 8-slot multi-slots, resulting in a valid range of {1 . . . 160}.

Figure 11A:
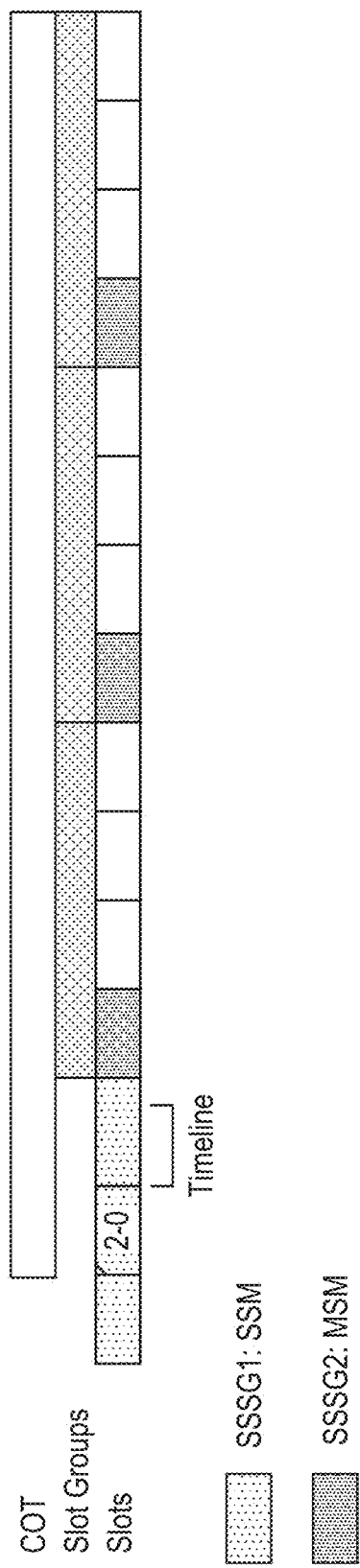
FIG. 11a illustrates an example of PDCCH monitoring in which a UE switches from a single-slot monitoring SSSG to a multi-slot monitoring SSSG, the multi-slot monitoring SSSG having a pattern of PDCCH monitoring that is fixed relative to the start of a channel occupancy time (COT), according to some embodiments.

FIG. 11a illustrates an example in which a UE switches from a SSM SSSG (SSSG1) to a MSM SSSG (SSSG2), SSSG2 having a fixed pattern of PDCCH monitoring, that is fixed relative to the start of a COT.

As illustrated, UE may initially use SSM to monitor SSSG1. At the second slot illustrated, the base station may initiate a COT, and may immediately transmit a DCI Format 2_0), which may be received by the UE within SSSG1. As a result, the UE may switch to SSSG2, which may include switching to MSM. The timeline indicated represents the time needed for the UE to transition to SSSG2 following the slot containing the received DCI Format 2_0). Thus, this may be equivalent to P1 as previously defined. The first MSM slot group may begin at the first slot boundary following completion of the timeline. The first MSM slot group may therefore be fixed relative to the start of the COT, with a delay determined by P1.

Figure 11B:
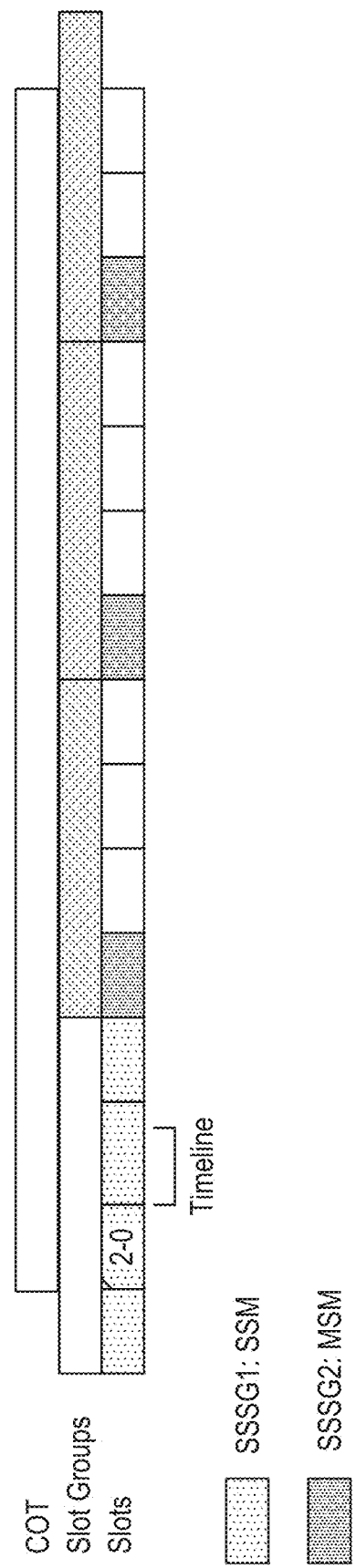
FIG. 11b illustrates an example of PDCCH monitoring in which a UE switches from a single-slot monitoring SSSG to a multi-slot monitoring SSSG, the multi-slot monitoring SSSG having a pattern of PDCCH monitoring that is fixed relative to the start of a subframe structure, according to some embodiments.

FIG. 11b illustrates an example in which a UE switches from a SSM SSSG (SSSG1) to a MSM SSSG (SSSG2), SSSG2 having a fixed pattern of PDCCH monitoring, that is fixed relative to the start of a known subframe structure.

As illustrated, UE may initially use SSM to monitor SSSG1. At the second slot illustrated, the base station may initiate a COT, and may immediately transmit a DCI Format 2_0, which may be received by the UE within SSSG1. As a result, the UE may switch to SSSG2, which may include switching to MSM. The timeline indicated again represents P1. However, in the example of FIG. 11b, SSSG2 has a fixed monitoring pattern with a slot group size of 4 slots, which is fixed to the start of a known subframe structure. Therefore, the UE may delay switching to SSSG2 until the start of the next slot group. Specifically, in this example, the subframe structure began at the start of the first illustrated slot. Because SSSG2 has a slot group size of 4, the next slot group begins at the fifth slot. The first MSM slot group monitored by the UE may therefore be fixed relative to the start of the subframe structure, rather than the start of the COT.

FIGS. 12-16: Transmission of DCI 2-0 with Beam Sweeping

As previously noted, DCI Format 2_0 may include a flag or other indication to trigger search space switching. Such switching may, in some scenarios as outlined above, occur upon entering a COT. DCI Format 2_0 may also include an indication of COT duration. Because DCI Format 2_0 carries these indications, it is important that the UE receive DCI Format 2_0 soon after the start of a COT. For example, reception of the COT duration may cause the UE to stop a LBT procedure, so as to avoid collision, and reception of the search space switching flag may allow the UE to save power by switching to a less burdensome SSSG configuration. However, DCI Format 2_0, as previously defined, may be unable to provide DCI Format 2_0 to all applicable UEs soon after the start of a COT, when utilizing beam sweeping.

In traditional implementations, search space configuration has been constrained such that each search space is configured in a separate symbol. DCI Format 2_0 is treated specially, such that it may be located only in the first 3 symbols of a slot.

Beam sweeping transmission is presently defined as associated with CORESET 0. CORESET 0 is expressed with reference to SSB, such that CORESET 0 is transmitted across a set of S consecutive single-slot PDCCH monitoring occasions, where S is the number of SSBs transmitted, as indicated in SIB1 (specifically indicated by ssb-PositionsInBurst). Each monitoring occasion corresponds to a respective SSB, and may carry a 2-sumbol DCI Format 2_0 within CORESET 0.

However, CORESET 0 is constrained to a maximum of two PDCCH per slot, such that transmitting 64 beams will span at least 32 slots, requiring 4 ms. By comparison, as defined in 3GPP EN 302_567, the maximum COT size is limited to 5 ms. Thus, communicating one DCI Format 2_0 per slot may potentially result in the final UE receiving a DCI Format 2_0 after approximately 80% of the COT has passed, which may be too late to be effective.

To resolve this dilemma, the base station may be allowed to schedule multiple DCI Format 2_0 within a single slot, e.g., at any position within the slot, while performing beam sweeping. In some implementations, the base station may schedule multiple DCI Format 2_0 within a single slot only in response to determining that LBT is configured. The duration may be set to be a number of transmission configuration indicator (TCI) States associated with the CORESET for DCI Format 2_0 transmission. For example, a 2-symbol DCI Format 2_0 may be transmitted for each TCI (corresponding to each beam direction). This may allow the base station to complete beam sweeping significantly more quickly.

In some implementations, the base station may provide to the UEs an RRC parameter "monitoringSymbolsWithinSlot", which may indicate to the UEs which TCIs will be transmitted. For example, monitoringSymbolsWithinSlot may represent a bitmap, in which a transmission will occur on a given symbol of a slot if the corresponding bit within monitoringSymbolsWithinSlot is set to "1".

The CORESET may be configured with a list of TCI States. Each UE may monitor its active TCI State from one of the TCI States of the configured TCI list.

In some implementations, the base station may link each monitoring opportunity with a TCI State in the CORESET configuration. For example, each monitoring opportunity may be transmitted with a specific, known TCI State. E.g., the first TCI State (the first beam direction) may be used for the first monitoring opportunity, the second TCI State may be used for the second monitoring opportunity, etc. Thus, a UE may monitor the monitoring opportunity corresponding to the active TCI State of that UE, and may decode the DCI Format 2_0 received during that monitoring opportunity. The UE may forego monitoring (e.g., not monitor) during other monitoring opportunities. This may result in power savings to the UE, by limiting the number of monitoring opportunities during which the UE is monitoring. The active TCI State of the UE may be updated via beam management procedures.

In other implementations, the base station may not explicitly link each monitoring opportunity with a TCI State. Thus, any TCI State may be transmitted within a given monitoring opportunity. In such implementations, a UE may monitor each monitoring opportunity, to determine which monitoring opportunity corresponds to the active TCI State of that UE, and may decode the DCI 2_0 occurring on that monitoring opportunity. Such implementations may provide increased flexibility in base station scheduling, due to the freedom to schedule any TCI State on a given monitoring opportunity. However, such implementations may increase complexity and power consumption at the UE, relative to implementations in which each monitoring opportunity is linked to a TCI State.

Figure 12:
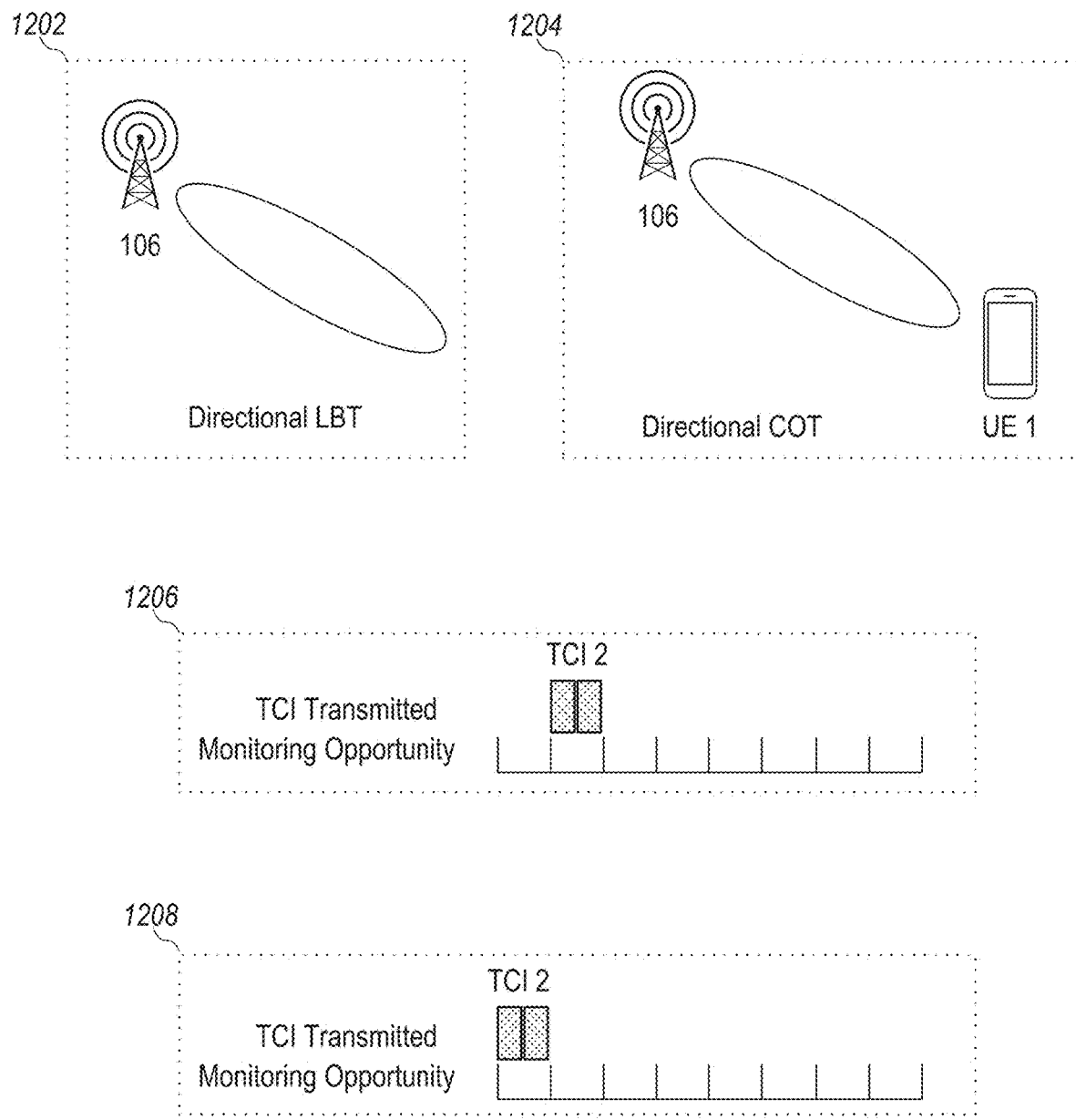
FIG. 12 illustrates a base station transmitting a DCI Format 2_0 via beam sweeping with a single-beam COT, according to some embodiments.

FIG. 12 illustrates a first example of beam sweeping as outlined above, in which only a single UE (UE1) is present in the network. As a result, only a single TCI State is transmitted (TCI State 2). As illustrated in scene 1202, the base station 106 may first use directional sensing with a single LBT beam to acquire a COT. Then, as illustrated in scene 1204, the base station may transmit to UE1 on the COT with a single beam direction, according to TCI State 2.

Scene 1206 illustrates transmission of the COT on single TCI State 2, in the scenario that the base station has linked each monitoring opportunity with a TCI State. Thus, as illustrated in scene 1206, TCI State 2 is transmitted in the second monitoring opportunity.

Scene 1208 illustrates transmission of the COT on single TCI State 2, in the scenario that the base station has not linked each monitoring opportunity with a TCI State. Thus, TCI State 2 may be transmitted in any appropriate monitoring opportunity. In the example of scene 1208, TCI State 2 is transmitted in the first monitoring opportunity, e.g., because it is the only TCI State transmitted within the slot.

In the scenario of FIG. 12, the DCI Format 2_0 may be transmitted to UE1 according to TCI State 2, e.g., within a first slot of the COT, and the remainder of the COT may be used for transmission of PDCCH/PDSCH to UE1.

For single beam COT, if DCI 2_0 is not transmitted, then unicast DCI may be used to schedule PDSCH and/or PUSCH, with or without a LBT indication for PUSCH.

Figure 13:
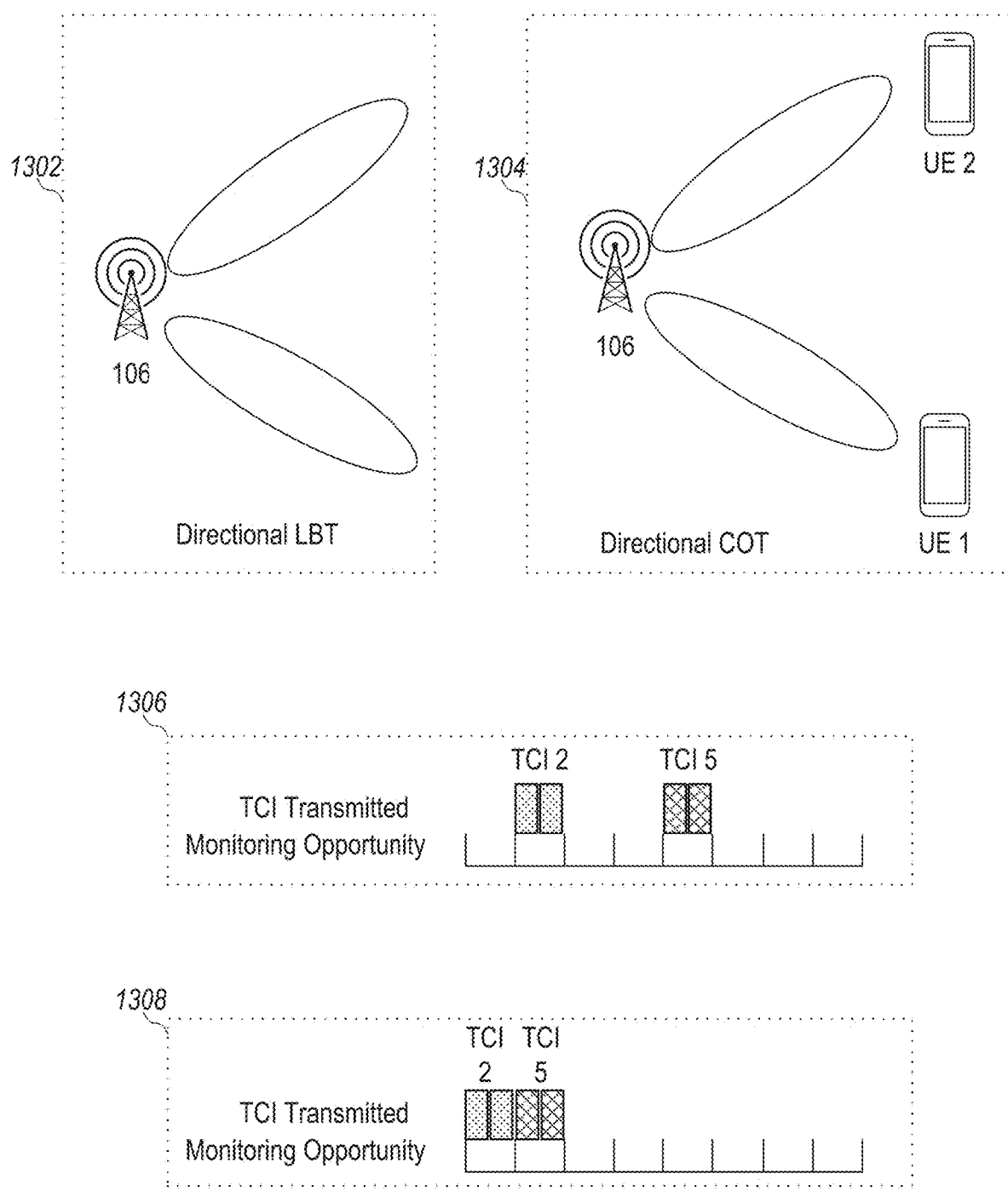
FIG. 13 illustrates a base station transmitting a DCI Format 2_0 via beam sweeping with a multi-beam COT, according to some embodiments.

FIG. 13 illustrates a second example of beam sweeping as outlined above, in which two UEs (UE1 and UE2) are present in the network. As a result, two TCI States are transmitted (TCI States 2 and 5). As illustrated in scene 1302, the base station 106 may first use directional sensing with a multiple LBT beams to acquire a multi-directional COT. Then, as illustrated in scene 1304, the base station may transmit to UE1 on the COT with a first beam direction, e.g., according to TCI State 2, and may transmit to UE2 on the COT with a second beam direction, e.g., according to TCI State 5.

Scene 1306 illustrates transmission of the COT on TCI State 2 and TCI State 5, in the scenario that the base station has linked each monitoring opportunity with a TCI State. Thus, as illustrated in scene 1306, TCI State 2 is transmitted in the second monitoring opportunity, and TCI State 5 is transmitted in the fifth monitoring opportunity.

Scene 1308 illustrates transmission of the COT on TCI State 2 and TCI State 5, in the scenario that the base station has not linked each monitoring opportunity with a TCI State. Thus, TCI State 2 and TCI State 5 may each be transmitted in any appropriate monitoring opportunity. In the example of scene 1308, TCI State 2 and TCI State 5 are transmitted in the first two monitoring opportunities. UE1 and UE2 may each monitor both of the occupied monitoring opportunities, and may decode the monitoring opportunity with the appropriate TCI State.

In the scenario of FIG. 13, the DCI Format 2_0 may be transmitted to UE1 according to TCI State 2 and DCI Format 2_0 may be transmitted to UE2 according to TCI State 5, e.g., within a first slot of the COT. At least a portion of the remaining resources of the COT may be used for transmission of PDCCH/PDSCH to UE1, and/or at least a portion of the remaining resources of the COT may be used for transmission of PDCCH/PDSCH to UE2.

Alternatively, if further enhanced multiple-input multileoutput (feMIMO) is available, the base station may transmit two TCI States, in two beams, simultaneously. Thus, in the example of FIG. 13, TCI State 2 and TCI State 5 may be transmitted on a single monitoring opportunity, which may be monitored by both UE1 and UE2. This may further reduce the beam sweeping time.

Figure 14:
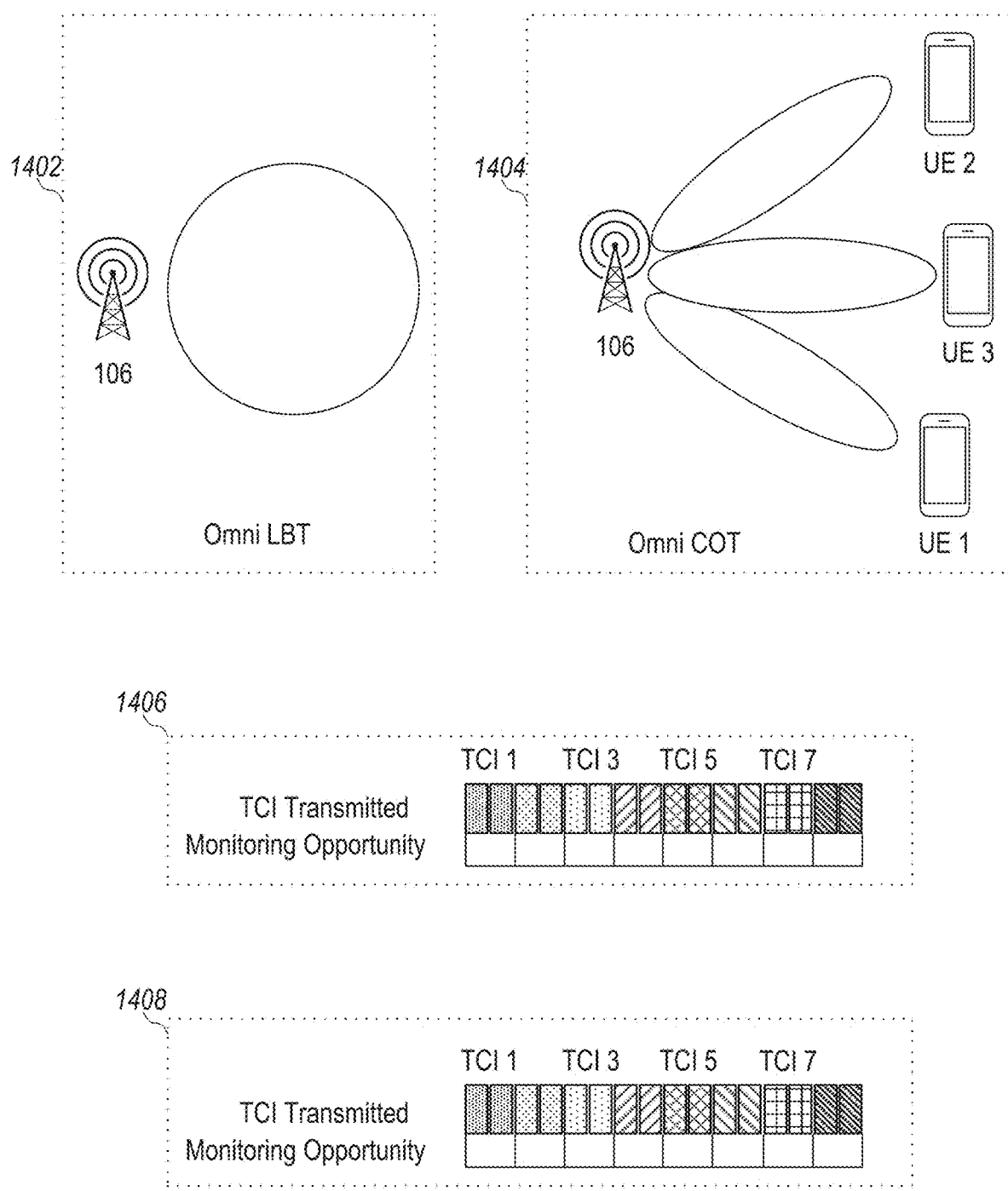
FIG. 14 illustrates a base station transmitting a DCI Format 2_0 via beam sweeping with an omni-directional COT, according to some embodiments.

FIG. 14 illustrates a third example of beam sweeping as outlined above, in which the COT is an omni-quasi-omni COT, and DCI 2_0 is transmitted to all UEs within the cell. As a result, a larger number (e.g., 8) of TCI States are transmitted, e.g., assuming 8 beams are used to cover the entire cell coverage area. As illustrated in scene 1402, the base station 106 may first use omni-directional sensing with an omni-directional LBT beam to acquire an omni-directional COT. Then, as illustrated in scene 1404, the base station may transmit to each UE on the COT with a respective beam direction, or may transmit to all UEs on the COT with an omni-directional beam, e.g., according to respective TCI States. Scene 1404 illustrates only three UEs, for simplicity, but the base station 106 may similarly transmit to additional UEs.

Scene 1406 illustrates transmission of the COT on all active TCI States, in the scenario that the base station has linked each monitoring opportunity with a TCI State. In this scenario, each UE may monitor only monitoring opportunity for its respective active TCI State.

Scene 1408 illustrates transmission of the COT on all active TCI States, in the scenario that the base station has not linked each monitoring opportunity with a TCI State. Thus, each active TCI State may be transmitted in any available monitoring opportunities. Each UE may monitor all occupied monitoring opportunities, and may decode the monitoring opportunity that carries that UE's active TCI State.

In the scenario of FIG. 14, the DCI Format 2_0 may be transmitted according to every active TCI State of the COT. At least a portion of the remaining resources of the COT may be used for transmission of PDCCH/PDSCH to each UE. It may be noted that a transmission of 8 or more 2-symbol DCI Format 2_0 will extend beyond a single slot. The same procedure may continue in a subsequent slot, with each monitoring opportunity containing one TCI State, with one DCI Format 2_0.

Alternatively, if feMIMO is available, the base station may transmit using two TCI States simultaneously. Thus, in the example of FIG. 14, four monitoring opportunities may each carry two TCI States, to enable transmission of 8 active TCI states.

Figure 15:
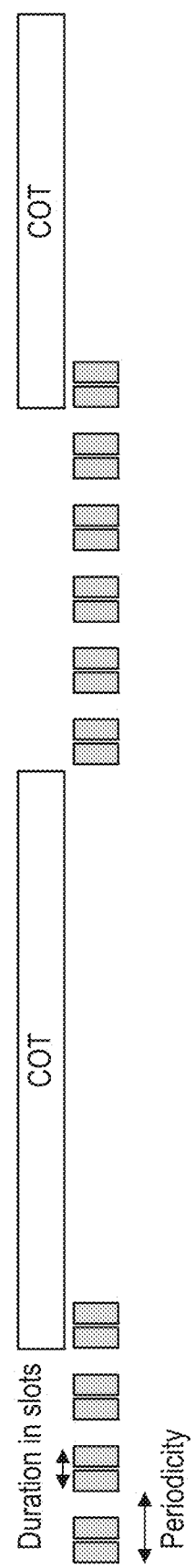
FIG. 15 illustrates an example of switching between two different CSS SSSGs for use inside and outside a COT, according to some embodiments.

FIG. 15 illustrates an additional use case of signaling DCI Format 2_0 at the start of a COT. As previously discussed, a UE may monitor a first CSS SSSG (SSSG1) while outside of a COT, to monitor for DCI Format 2_0. According to SSSG1, the UE may monitor frequently, to ensure that the DCI Format 2_0 is not missed.

Upon entering a COT, the base station may transmit DCI Format 2_0, e.g., early in the COT. The DCI Format 2_0 may include a flag or other indication for the UE to switch from SSSG1 to a second SSSG (SSSG2) for the duration of the COT. SSSG2 may specify less frequent monitoring occasions than SSSG1. In some scenarios, such as in the example of FIG. 15, SSSG2 may not include further CSS monitoring occasions until the end of the COT. SSSG2 may specify a monitoring occasion at or near the end of the COT, at which time the UE may receive another DCI Format 2_0, which may include a flag or other indication for the UE to switch back to SSSG1.

Alternatively, the base station may not provide an indication for the UE to switch to a different SSSG during the COT, but the UE may be configured to, in response to receiving a DCI Format 2_0 indicating a COT duration, stop monitoring the monitoring occasions for DCI Format 2_0 for the remainder of the COT duration. The UE may then resume monitoring for DCI Format 2_0 after the COT ends.

When COT duration is specified within DCI Format 2_0, the duration may be measured in various ways. Specifically, the duration is traditionally measured starting from the slot where the UE detects the DCI Format 2_0. However, if the number of TCI States is sufficiently large to cause the DCI Format 2_0 to require more than one slot, then this definition may cause ambiguity. For example, in some implementations, the DCI Format 2_0 content may remain the same during the entire sweeping sequence. The COT duration may be considered to begin from the end of the last PDCCH monitoring occasion within the present SSSG period. Alternatively, the COT duration may be considered to begin from the end of the first PDCCH monitoring occasion within the present SSSG period.

In other implementations, the DCI Format 2_0 content may be updated during the beam sweeping process. In such scenarios, the COT duration may be considered to begin following the last symbol of the monitoring occasion. However, it may be desirable to specify the COT duration as a number of slots, rather than as a number of symbols. Specifically, with high SCS, such as 960 kHz, the COT duration may include up to 4480 symbols, which would require 13 bits to signal.

In any of these implementations, the slot format indicator (SFI) index field defined in the DCI Format 2_0, if configured, may start at the same time as the COT duration.

Any of the methods described herein for operating a base station (BS) may be the basis of a corresponding method for operating a UE, by interpreting each message/signal X received by the BS in the UL as message/signal X transmitted by the UE, and each message/signal Y transmitted in the DL by the BS as a message/signal Y received by the UE. Moreover, a method described with respect to a UE may be interpreted as a method for a BS in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a BS 102, or UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing search space set switching, the method comprising:
  by a wireless communication apparatus:
    monitoring a first search space set group for physical downlink control channel (PDCCH) transmissions, wherein the first search space set group includes at least a first search space with a first monitoring configuration;
    receiving a downlink control indicator (DCI) Format 2_0 message, wherein the DCI Format 2_0 message includes an indication for the wireless communication apparatus to switch to monitoring a second search space set group, wherein monitoring the second search space set group comprises monitoring a second search space with a second monitoring configuration including monitoring the second search space in a set of Y slots of each group of a series of multi-slot groups of either X=4 or X=8 slots;
    in response to the indication, switching to start monitoring the second search space set group and stop monitoring the first search space set group at a start of a next full multi-slot group of X slots for the second search space that is at least P symbols from a last symbol of a PDCCH transmission corresponding to the DCI Format 2_0 message, wherein the P symbols is a predetermined time.

2. The method of claim 1, further comprising:
  by the wireless communication apparatus:
    monitoring a third search space set group, concurrently with monitoring the first search space set group, wherein the third search space set group includes a user equipment (UE)-specific search space with the first monitoring configuration, wherein the DCI Format 2_0 message includes an indication for the wireless communication apparatus to switch to monitoring a fourth search space set group, wherein the fourth search space set group includes a UE-specific search space with the second monitoring configuration; and in response to the indication, switching to monitoring the fourth search space set group instead of the third search space set group.

3. The method of claim 2, wherein the second search space set group has a slot group size that is different from a slot group size of the fourth search space set group.

4. The method of claim 2, further comprising:
by the wireless communication apparatus:
transmitting to a base station an indication of first multi-slot monitoring capabilities of the wireless communication apparatus with regard to common search space monitoring, wherein the second search space set group is configured to not exceed the first multi-slot monitoring capabilities; and
transmitting to the base station an indication of second multi-slot monitoring capabilities of the wireless communication apparatus with regard to UE-specific search space monitoring, wherein the fourth search space set group is configured to not exceed the second multi-slot monitoring capabilities.

5. The method of claim 4,
wherein the first multi-slot monitoring capabilities include an indication that the wireless communication apparatus can accommodate monitoring of non-contiguous symbols within a multi-slot span of a common search space, and
wherein the second multi-slot monitoring capabilities include an indication that the wireless communication apparatus cannot accommodate monitoring of non-contiguous symbols within a multi-slot span of a UE-specific search space.

6. The method of claim 2, further comprising:
by the wireless communication apparatus:
transmitting to a base station an indication of multi-slot monitoring capabilities for each PDCCH type of a plurality of PDCCH types, wherein the second search space set group and the fourth search space set group are configured to not exceed the indicated multi-slot monitoring capabilities.

7. The method of claim 6, wherein the indication of multi-slot monitoring capabilities further includes distinct capabilities for at least one PDCCH type of the plurality of PDCCH types, for each of at least two different sub-carrier spacings.

8. The method of claim 1, further comprising:
by the wireless communication apparatus:
receiving, from a base station, an indication of a number of PDCCH categories that are configured for search space set switching; and
receiving, from the base station, an indication of a number of search space set groups configured for each of the PDCCH categories.

9. The method of claim 8, wherein the number of search space set groups configured for a first of the PDCCH categories is different than the number of search space set groups configured for a second of the PDCCH categories.

10. The method of claim 1, wherein the DCI Format 2_0 message is received on one beam of a beam sweeping sequence, wherein multiple beams of the beam sweeping sequence carry respective copies of the DCI Format 2_0 within a single slot.

11. The method of claim 1, further comprising:
by the wireless communication apparatus:
transmitting to a base station an indication of multi-slot monitoring capabilities corresponding to a multi-slot group size of 4 or 8 and a value for Y.

12. The method of claim 1, wherein a subcarrier spacing associated with the PDCCH transmission is one of 480 kHz and 960 kHz.

13. An apparatus for performing communication functions in a user equipment (UE) device, the apparatus comprising:
memory, storing software instructions; and
at least one processor configured to execute the software instructions to cause the UE device to:
monitor a first search space set group for physical downlink control channel (PDCCH) transmissions, wherein the first search space set group includes at least a first search space with a first monitoring configuration;
receive a downlink control indicator (DCI) Format 2_0 message, wherein the DCI Format 2_0 message includes an indication for the UE device to switch to monitoring a second search space set group, wherein the second search space set group comprises monitoring a second search space with a second monitoring configuration including monitoring the second search space in a set of Y slots of each group of a series of multi-slot groups of either X=4 or X=8 slots;
in response to the indication, switch to start monitoring the second search space set group and stop monitoring the first search space set group at a start of a next full multi-slot group of X slots for the second search space that is at least P symbols from a last symbol of a PDCCH transmission corresponding to the DCI Format 2_0 message, wherein the P symbol is a predetermined time.

14. The apparatus of claim 13, wherein the at least one processor is configured to execute the software instructions to further cause the UE device to:
monitor a third search space set group, concurrently with monitoring the first search space set group, wherein the third search space set group includes a UE-specific search space with the first monitoring configuration, wherein the DCI Format 2_0 message includes an indication for the UE device to switch to monitoring a fourth search space set group, wherein the fourth search space set group includes a UE-specific search space with the second monitoring configuration; and
in response to the indication, switch to monitoring the fourth search space set group instead of the third search space set group.

15. The apparatus of claim 14, further comprising:
by the UE device:
transmitting to a base station an indication of first multi-slot monitoring capabilities of the UE device with regard to common search space monitoring, wherein the second search space set group is configured to not exceed the first multi-slot monitoring capabilities; and
transmitting to the base station an indication of second multi-slot monitoring capabilities of the UE device with regard to UE-specific search space monitoring, wherein the fourth search space set group is configured to not exceed the second multi-slot monitoring capabilities.

16. The apparatus of claim 15,
wherein the first multi-slot monitoring capabilities include an indication that the UE device can accommodate monitoring of non-contiguous symbols within a multi-slot span of a common search space, and
wherein the second multi-slot monitoring capabilities include an indication that the UE device cannot accommodate monitoring of non-contiguous symbols within a multi-slot span of a UE-specific search space.

17. A non-transitory computer-readable memory medium storing software instructions that, when executed by a processor of a user equipment (UE) device, cause the UE device to:
monitor for downlink control indicator (DCI) detection using a first search space set group for physical downlink control channel (PDCCH) transmissions, wherein the first search space set group includes at least a first search space with a first monitoring configuration;
receive a DCI Format 2_0 message, wherein the DCI Format 2_0 message includes an indication for the UE device to switch to monitoring a second search space set group, wherein monitoring the second search space set group comprises monitoring a second search space with a second monitoring configuration including monitoring the second search space in a set of Y slots of each group of a series of multi-slot groups of either X=4 or X=8 slots;
in response to the indication, switch to start monitoring the second search space set group and stop monitoring the first search space set group at a start of a next full multi-slot group of X slots for the second search space that is at least P symbols from a last symbol of a PDCCH transmission corresponding to the DCI Format 2_0 message, wherein the P symbols is a predetermined time.

18. The non-transitory computer-readable memory medium of claim 17, wherein switching to monitoring the second search space set group instead of the first search space set group includes:
determining a start time of a next slot to begin at least a first predetermined processing time after a slot in which the DCI Format 2_0 message is received; and
switching to monitoring the second search space set group instead of the first search space set group as of the determined start time of the next slot.

19. The non-transitory computer-readable memory medium of claim 17, wherein switching to monitoring the second search space set group instead of the first search space set group includes:
determining a start time of a next multi-slot slot group of the second search space set group, wherein the slot groups of the second search space set group are fixed relative to the start of a subframe structure.

20. The non-transitory computer-readable memory medium of claim 17, wherein the software instructions further cause the UE device to:
receive, from a base station, an indication of a number of PDCCH categories that are configured for search space set switching; and
receive, from the base station, an indication of a number of search space set groups configured for each of the PDCCH categories.

* * * * *